(12) United States Patent
Mashiki (10) Patent No.: US 7,007,663 B2
(45) Date of Patent: Mar. 7, 2006

(54) INTERNAL COMBUSTION ENGINE KNOCK CONTROL APPARATUS AND METHOD

(75) Inventor: Zenichiro Mashiki, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/792,211

(22) Filed: Mar. 4, 2004

(65) Prior Publication Data

US 2004/0182360 A1    Sep. 23, 2004

(30) Foreign Application Priority Data

Mar. 18, 2003  (JP) .............................. 2003-073467

(51) Int. Cl.
  *F02P 5/152*  (2006.01)
  *F02D 35/02* (2006.01)
(52) U.S. Cl. .................. 123/305; 701/111; 123/406.35
(58) Field of Classification Search ................ 701/111; 73/35.01, 35.03, 35.05, 35.06; 123/406.35, 123/406.4
  See application file for complete search history.

(56) References Cited

U.S. PATENT DOCUMENTS

| 4,467,634 A | * | 8/1984 | Rohde et al. ............... 73/35.03 |
| 4,640,250 A | * | 2/1987 | Hosaka et al. ......... 123/406.35 |
| 5,038,735 A | * | 8/1991 | Hosoya et al. ......... 123/406.21 |
| 5,144,929 A | | 9/1992 | Hosoya et al. |
| 5,267,164 A | | 11/1993 | Miyama |
| 5,739,417 A | | 4/1998 | Grob et al. |
| 6,311,672 B1 | | 11/2001 | Morishita et al. |
| 6,557,527 B1 | | 5/2003 | Miyaji |
| 6,701,894 B1 | | 3/2004 | Katagami |
| 6,727,812 B1 | * | 4/2004 | Sauler et al. ............... 701/111 |
| 6,736,109 B1 | | 5/2004 | Hoshino |

FOREIGN PATENT DOCUMENTS

| JP | A 5 8065974 | 4/1983 |
| JP | A 6 1018838 | 7/1984 |
| JP | A 0 2275043 | 11/1990 |
| JP | A 10-159642 | 6/1998 |
| JP | A 10-318027 | 12/1998 |

* cited by examiner

*Primary Examiner*—Henry C. Yuen
*Assistant Examiner*—Arnold Castro
(74) *Attorney, Agent, or Firm*—Kenyon & Kenyon

(57) ABSTRACT

When a fuel injection period and a knock determination period switch from a state in which they do not overlap to a state in which they do overlap, operational noise from a fuel injector rides on an output signal from a knock sensor during the knock determination period. By preventing execution of knock control that changes the ignition timing based on determination results from after that switch until a predetermined period of time has passed, it is possible to preferably avoid a case in which the ignition timing is improperly changed based on an erroneous determination in the knock determination due to an effect from operational noise from the fuel injector.

22 Claims, 7 Drawing Sheets

INTERNAL COMBUSTION ENGINE KNOCK CONTROL APPARATUS AND METHOD

INCORPORATION BY REFERENCE

The disclosure of Japanese Patent Application No. 2003-73467 filed on Mar. 18, 2003, including the specification, drawings and abstract is incorporated herein by reference in its entirety.

BACKGROUND OF THE INVENTION

1. Field of the Invention

The invention relates to an internal combustion engine knock control apparatus and method for making a knock determination based on an output signal from a knock sensor and changing an engine control amount based on the determination results.

2. Description of the Related Art

As is well known, in many internal combustion engines, knock control is performed in which a knock determination is made to determine the presence or absence of knock and the ignition timing and the like is adjusted in accordance with the determination results. Ordinarily, the knock determination is made using a knock sensor, which is a vibration detecting sensor mounted on the cylinder block or the like. The presence or absence of knock is then detected based on an output signal from the knock sensor during a predetermined period (i.e., a knock determination period) after ignition in each cylinder.

Recently in-cylinder internal combustion engines, which have a fuel injector provided such that the nozzle hole is exposed to the combustion chamber, and in which fuel is injected directly into the cylinder, have been put into practical use. Some in-cylinder internal combustion engines can switch combustion systems, changing between homogeneous combustion and stratified-charged combustion, by changing the fuel injection timing between the intake stroke and the compression stroke based on the operating state of the engine. Other in-cylinder internal combustion engines improve the combustion state within the cylinders by controlling the airflow in each cylinder with an airflow control valve provided in the intake port or the like.

When the combustion mode of the internal combustion engine is changed by switching the combustion system or using airflow control or the like, the rate of combustion inside the cylinder changes which also changes the timing of knock occurrence after the fuel is ignited. In response to this, JP-A-10-159642 proposes technology which changes the knock determination period according to the combustion mode in an in-cylinder internal combustion engine. This technology enables suitable knock detection to be performed irrespective of a change in the timing of knock occurrence, which occurs when the combustion mode changes.

The fuel injector that injects the fuel in the internal combustion engine is designed such that, to start a fuel injection, an electromagnetic solenoid is energized to drive a nozzle needle away from a valve seat, thus opening a valve. To stop the fuel injection, the electromagnetic solenoid is de-energized such that the nozzle needle comes to be seated back against the valve seat.

When operated, this kind of fuel injector produces vibration, such as of a sound produced by the nozzle needle hitting the valve seat when the valve closes. This vibration may ride as noise on the output signal from the knock sensor. In particular, there is a tendency for the effect from the noise produced by operation of the fuel injector on the output signal from the knock sensor to be greater with in-cylinder injection type internal combustion engines than with port injection type internal combustion engines due to the fact that in in-cylinder injection type internal combustion engines the fuel injector is mounted nearer the knock sensor.

Conventionally, however, the knock determination period and the fuel injection timing were set without consideration given to the effect of the operational noise from the fuel injector on the knock determination. Therefore, it is possible that the operational noise from the fuel injector may ride on the output signal from the knock sensor during the knock determination period, which may result in an erroneous determination that knock is occurring even if, in actuality, it is not. As a result, improper control may end up being performed.

That is, when the knock determination period does not overlap with the fuel injection period, operational noise from the fuel injector does not ride on the detection signal from the knock sensor so background noise appearing on the detection signal is relatively low. In this case, when the fuel injection timing is switched so that the knock determination period overlaps with the fuel injection period, operational noise from the fuel injector starts to ride on the detection signal from the knock sensor. Immediately after this switch in the fuel injection timing, a knock determination is made presuming the background noise level that was low up until that point. Therefore, until the background noise level that reflects the correct operational noise from the fuel injector is learned, the operational noise from the fuel injector that appears on the detection signal from the knock sensor may be erroneously determined to be from knock. Then based on that erroneous determination, improper control in which an engine control amount, such as the ignition timing, is changed inappropriately ends up being performed.

SUMMARY OF THE INVENTION

In view of the foregoing problems, this invention thus provides an internal combustion engine knock control apparatus and method able to appropriately avoid improper control from being performed due to the effect of operational noise from a fuel injector.

A first aspect of the invention relates to an internal combustion engine knock control apparatus applied to a multi-cylinder internal combustion engine that changes a fuel injection timing in each cylinder based on an operating state of the engine. This knock control apparatus makes a knock determination for each cylinder based on an output signal from a knock sensor during a knock determination period corresponding to each cylinder and changes an engine control amount based on the determination results. The knock control apparatus is provided with a prohibiting device that prohibits execution of the knock determination when a fuel injection period in a first cylinder overlaps with the knock determination period corresponding to a second cylinder.

In this aspect of the invention, when the fuel injection period and the knock determination period overlap such that there is a possibility of the results of the knock determination being erroneous due to operational noise from the fuel injector, execution of the knock determination is prohibited. As a result, it is possible to avoid a case in which operational noise from the fuel injector rides on the output signal from the knock sensor during the knock determination period resulting in erroneous results being obtained. Accordingly, it is possible to appropriately avoid improper control from being performed due to the effect of operational noise from the fuel injector.

Also, a second aspect of the invention relates to an internal combustion engine knock control apparatus applied to a multi-cylinder internal combustion engine that changes a fuel injection timing in each cylinder based on an operating state of the engine. In this aspect of the invention, the knock control apparatus makes a knock determination for each cylinder based on an output signal from a knock sensor during a knock determination period corresponding to each cylinder and changes an engine control amount based on the determination results. According to this aspect of the invention, the knock control apparatus is provided with a prohibiting device that prohibits a change in the engine control amount based on the determination results when a fuel injection period in a first cylinder overlaps with the knock determination period corresponding to a second cylinder.

According to this structure, when the fuel injection period and the knock determination period overlap such that there is a possibility that the results of the knock determination are erroneous due to operational noise from the fuel injector, a change in the engine control amount based on the determination results is prohibited. As a result, it is possible to suitably avoid improper control from being performed due to the effect from operational noise from the fuel injector.

Further, a third aspect of the invention relates to an internal combustion engine knock control apparatus applied to a multi-cylinder internal combustion engine that changes a fuel injection timing in each cylinder based on an operating state of the engine. In this aspect of the invention, the knock control apparatus makes a knock determination for each cylinder based on an output signal from a knock sensor during a knock determination period corresponding to each cylinder and changes an engine control amount based on the determination results. Also according to this aspect of the invention, the knock control apparatus is provided with a prohibiting device that, when a fuel injection period of a first cylinder and the knock determination period corresponding to a second cylinder switch from a non-overlapping state to an overlapping state, prohibits a change in the engine control amount based on the determination results from after that switch until a predetermined period has passed.

According to this structure, a change in the engine control amount based on the results of the knock determination is prohibited after the fuel injection period and the knock determination period switch from a non-overlapping state to an overlapping state until a predetermined period of time has passed. Accordingly, it is possible to prohibit the engine control amount from being changed based on the determination results until a background noise level that correctly reflects the effect of operational noise from the fuel injector is learned, i.e., until a proper knock determination can be made. Thus it is possible to appropriately avoid a case in which the engine control amount is changed improperly based on the erroneous results of the knock determination.

Therefore, according to this structure, it is possible to appropriately avoid improper control from being performed due to the effect from operational noise from the fuel injector. The predetermined period of time referred to above is preferably set to be a period during which there is sufficient time to properly learn the background noise level that has increased due to operational noise of the fuel injector, after the knock determination period and the fuel injection period have overlapped.

In the third aspect of the invention, the knock control apparatus may further be provided with i) a learning device that learns a knock limit value for the engine control amount based on the determination results, and ii) a setting device that sets the engine control amount to the side of the knock limit value where knock is less apt to occur, based on the knock limit value learned by the learning device when a change in the engine control amount based on the determination results is prohibited by the prohibiting device.

According to this structure, the knock limit value for the engine control amount is learned based on the determination results while the knock determination is being properly made. Then, when a change in the engine control amount based on the determination results of the knock determination is prohibited by the prohibiting device, i.e., when a proper knock determination is unable to be made due to the effect of operational noise from the fuel injector, the engine control amount is set to the side of the knock limit value where knock is less apt to occur based on the learned knock limit value. Accordingly, even when a change in the engine control amount based on the determination results of the knock determination is not able to be properly made, the engine control amount is set to a value that enables knock to be avoided. Therefore, according to this structure, even if a proper knock determination is unable to be made due to the effect of operational noise from the fuel injector, knock is still able to be suitably inhibited.

The learning device may learn the knock limit value by obtaining, based on the determination results, a learning value for learn-correcting the knock limit value of the engine control amount.

In each of the foregoing aspects of the invention, the engine control amount may be an ignition timing. While advancing the ignition timing a certain degree is beneficial for engine output performance and the like, advancing it too much results in the generation of knock. Therefore, in many spark ignition type internal combustion engines, knock control is performed to advance the ignition timing to the point just before which knock occurs, i.e., to a knock limit ignition timing, based on the determination results of the knock determination. In an internal combustion engine which performs knock control, the above structure makes it possible to avoid a case in which the engine output is reduced due to the ignition timing being retarded erroneously from the effect of operational noise from the fuel injector, regardless of the fact that knock is not occurring.

In the second and third aspects of the invention, the engine control amount may be the ignition timing and the knock control apparatus may further be provided with i) a learning device that learns the knock limit ignition timing based on the determination results, and ii) a setting device that sets the ignition timing to the retard side of the knock limit ignition timing based on the knock limit ignition timing learned by the learning device, when a change in the ignition timing based on the determination results is prohibited by the prohibiting device.

In the third aspect of the invention, the engine control amount may be the ignition timing and the knock control apparatus may further be provided with i) a learning device that obtains a learning value for learn-correcting the knock limit ignition timing based on the determination results, and ii) a setting device that sets the ignition timing to the retard side of the knock limit ignition timing based on the learning value, when a change in the ignition timing based on the determination results is prohibited by the prohibiting device.

According to this structure, it is possible to appropriately inhibit knock from occurring even while a change in the ignition timing based on the determination results of the knock determination is prohibited.

In each foregoing aspect of the invention, the knock determination may be made based on a comparison between i) a background level obtained based on the output signal from the knock sensor during the knock determination period in the knock determinations up until the last time, and ii) the output signal from the knock sensor during the knock determination period in the knock determination this time.

In each foregoing aspect of the invention, the internal combustion engine may be an in-cylinder injection type internal combustion engine. In the in-cylinder injection type internal combustion engine, fuel is injected directly into the cylinder so the fuel injector is mounted closer to the knock sensor than it is in a port injection type internal combustion engine. Therefore, the degree of effect from operational noise from the fuel injector on the output signal from the knock sensor during the knock determination period is even larger than it is in a port injection type internal combustion engine. Accordingly, even more remarkable effects are able to be obtained by applying a knock control apparatus for an internal combustion engine such as that described any one of the foregoing aspects of the invention.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which.

DETAILED DESCRIPTION OF THE PREFERRED EMBODIMENTS

Figure 1:
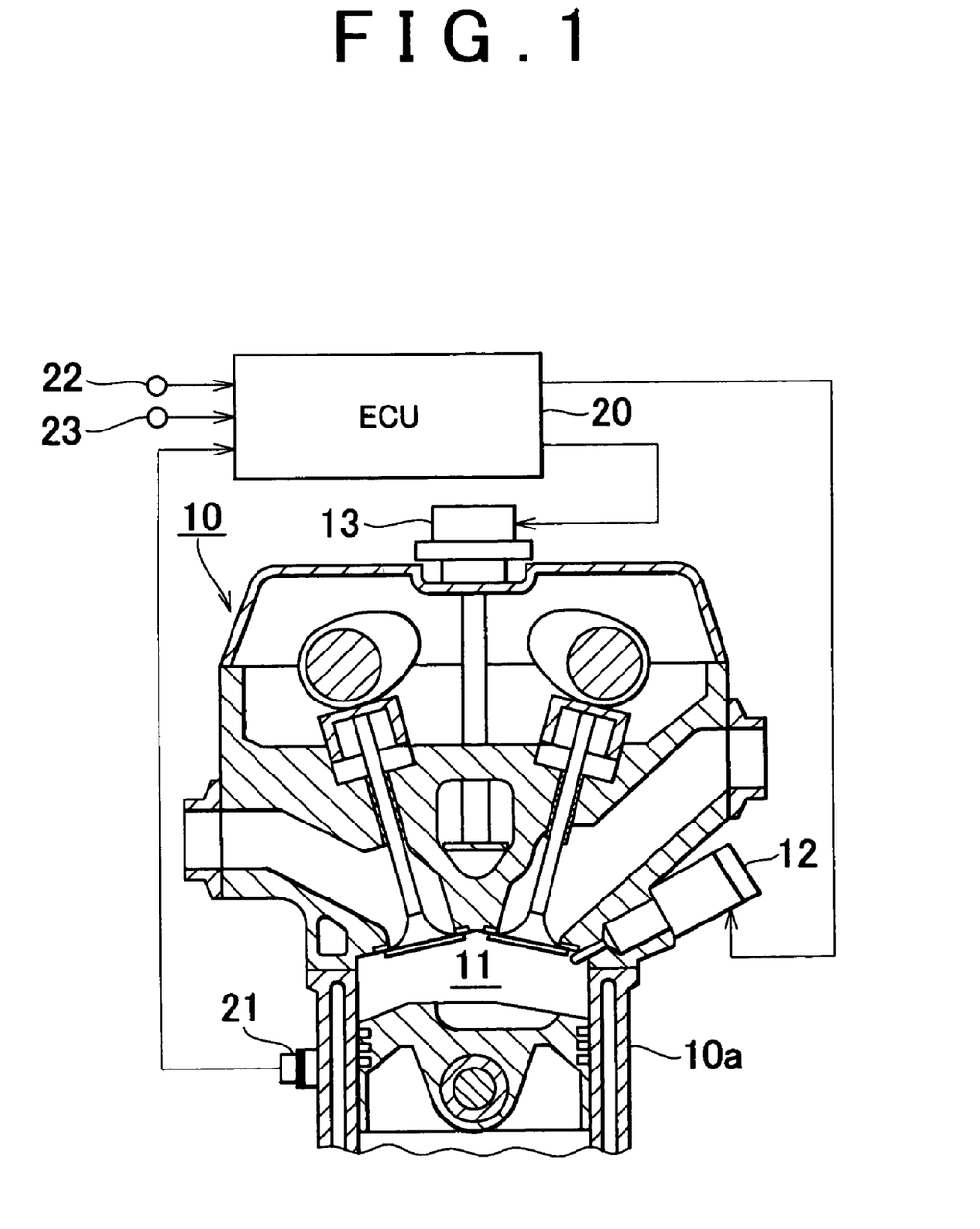
FIG. 1 is a representative view showing the structure of a control system for an internal combustion engine according to a first exemplary embodiment of the invention.

In the following description and the accompanying drawings, the present invention will be described in more detail in terms of exemplary embodiments. FIG. 1 shows the structure of a control system for an internal combustion engine 10 according to a first exemplary embodiment of the invention. The internal combustion engine 10 is an in-cylinder injection type internal combustion engine which has four cylinders, and which directly injects fuel into a combustion chamber 11 of each cylinder from a fuel injector 12 provided in each cylinder.

The engine control for the internal combustion engine 10 is performed by an electronic control unit (ECU) 20. This ECU 20 includes, for example, a central processing unit (CPU) which executes various routines relating to engine control, memory which stores control programs and information necessary for engine control, a waveform shaping circuit, and driving circuits for the fuel injector 12 and an igniter 13 and the like.

Various sensors for detecting the engine operating state are connected to the ECU 20. For example, a NE sensor 22 detects a rotational angle of a crankshaft, which is the engine output shaft, and thus detects an engine speed NE. An accelerator sensor 23 detects an accelerator operation amount ACCP. Further, a knock sensor 21 mounted on a cylinder block 10a of the internal combustion engine 10 detects vibration transmitted to the cylinder block 10a from inside the combustion chamber 11 of each cylinder.

In addition, various detection signals from sensors necessary for engine control, such an airflow meter that detects an intake airflow quantity and a coolant temperature sensor that detects the temperature of engine coolant, are input to the ECU 20. The ECU 20 then executes various engine controls including fuel injection control and ignition timing control in accordance with the operating state of the internal combustion engine 10, which is able to be learned by the detection signals from the various sensors.

The detection signal from the NE sensor 22 is input to the waveform shaping circuit in the ECU 20. The waveform shaping circuit then generates various signals for determining the execution timing of various controls based on the detection signal from the NE sensor 22, and outputs those various signals to the CPU.

Next, the outline of a fuel injection control in this exemplary embodiment will be described. The ECU 20 calculates the fuel injection quantity and fuel injection timing based on the operating state of the engine, such as the engine speed NE and the engine load. The ECU 20 then calculates a fuel injection time which is the fuel injection time during which the fuel injector can inject the required amount of fuel based on the calculated fuel injection quantity and the engine speed NE. The ECU 20 then generates a fuel injection signal for each cylinder based on the calculated fuel injection timing and fuel injection time and outputs each signal to the fuel injector 12 in the respective cylinder.

The fuel injection signal is turned on at the timing indicated by the fuel injection timing and remains on until the fuel injection time is up. When the fuel injection signal turns on, an electromagnetic solenoid of the fuel injector 12 is energized to drive a nozzle needle away from a valve seat by electromagnetic force, thus opening the nozzle hole of the fuel injector 12 and starting the fuel injection. When the fuel injection signal is turned off, the electromagnetic solenoid is de-energized such that the nozzle needle comes to be seated back against the valve seat, thus closing the nozzle hole of the fuel injector 12 and stopping the fuel injection. The fuel injection by the fuel injector 12 is performed for the period during which the fuel injection signal is on, thus enabling an appropriate amount of fuel to be supplied at the appropriate timing according to the operating state of the engine.

Meanwhile, the ECU 20 performs knock control, making a knock determination to determine the presence or absence of knock based on the detection results from the knock sensor 21 and changing the ignition timing based on the determination results.

First, the knock determination in this exemplary embodiment will be described. The waveform shaping circuit in the ECU 20 generates a gate signal based on the detection signal from the NE sensor 22 and outputs it to the CPU. The gate signal is a signal that determines the period during which the output signal from the knock sensor 21 relating to the knock determination is to be sampled. The knock determination is made referencing the output signal from the knock sensor 21 during the period for which the gate signal is on. Accordingly, in this case the period during which the gate signal is on is the knock determination period, during which the knock determination is made based on the output signal from the knock sensor 21.

Incidentally, the on timing and off timing of the gate signal are indicated by the crank angle (ATDC), with TDC on the compression stroke of each cylinder being the reference point. Here, the knock determination period is a period from 10 degrees CA after TDC to 60 degrees CA after TDC of the compression stroke in each cylinder. That is, the gate signal is turned on after ATDC 10 degrees CA and turned off after ATDC 60 degrees CA in each cylinder.

The knock determination in this exemplary embodiment is made based on a peak hold value VKPEAK (maximum value) for the output signal from the knock sensor 21 during the knock determination period. Based on a presumption that a logarithmic transformation value LVPK of the peak hold value VKPEAK is indicative of normal distribution, a knock determination formula is employed to determine the presence or absence of knock by the position of the logarithmic transformation value LVPK that was sampled this time within that distribution.

Figure 2:
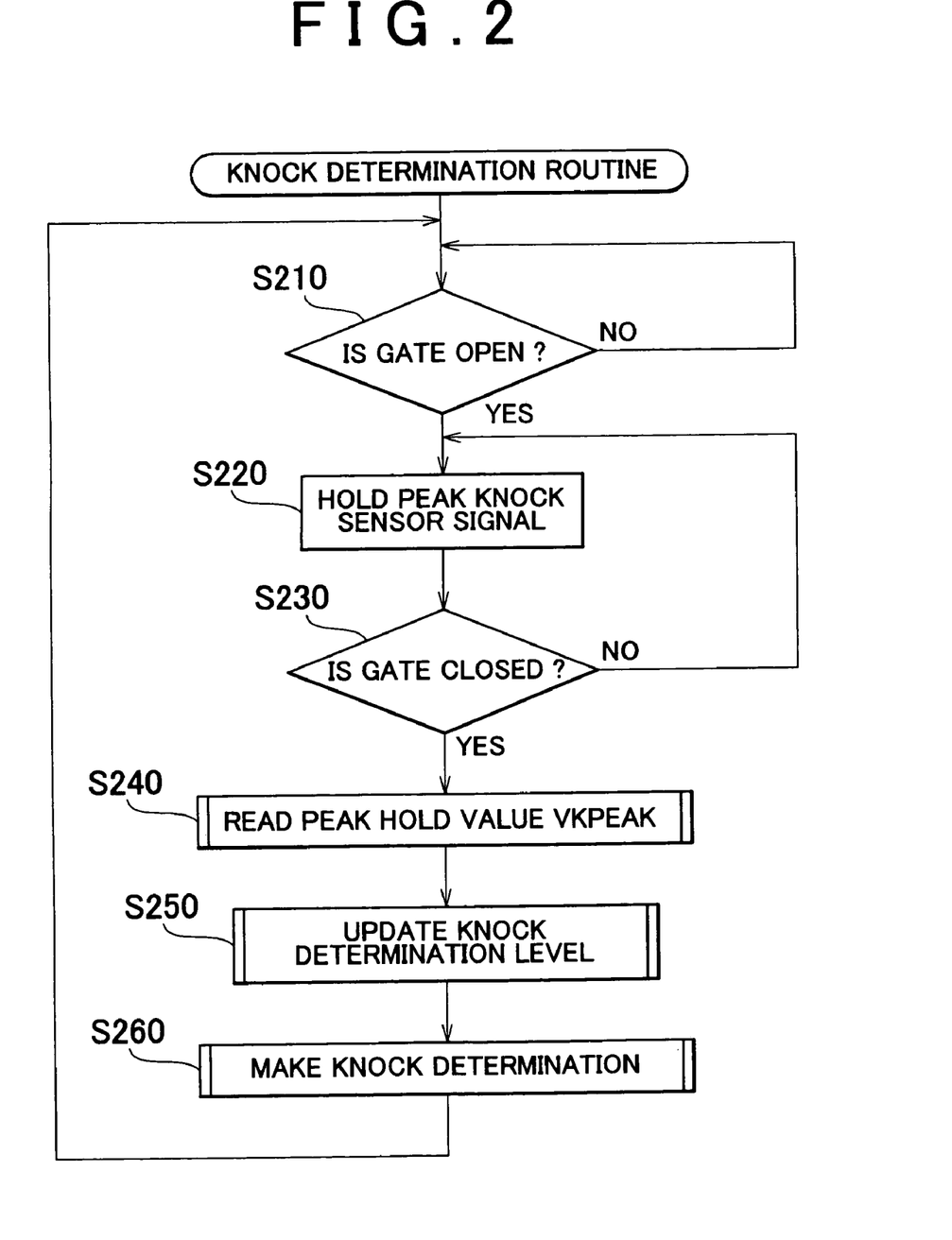
FIG. 2 is a flowchart illustrating a knock determination routine according to the first exemplary embodiment of the invention.

FIG. 2 shows a flowchart of that knock determination routine. When the gate signal is turned on such that the gate for knock determination opens (i.e., YES in step S210), the peak output signal from the knock sensor 21 for the subject cylinder starts to be held (step S220). That is, the peak hold value VKPEAK which is the maximum value of the output signal from the knock sensor 21 after the gate signal has been turned on is obtained.

When the gate signal is turned off such that the gate closes (i.e., YES in step S230), the peak hold value VKPEAK at that time, i.e., the maximum value of the output signal from the knock sensor 21 during the knock determination period, is read (step S240).

The knock determination level is then updated (step S250) in the following manner based on that peak hold value VKPEAK.

First, distribution parameters indicative of the distribution tendency of the logarithmic transformation value LVPK, i.e., a distribution medium value VMED and a standard deviation value SGM, are updated based on the logarithmic transformation value LVPK of the peak hold value VKPEAK that was sampled this time. This updating is done based on Expression 1 and Expression 2 below. That is, the distribution medium value VMED and the standard deviation value SGM are roughly estimated by increasing or decreasing the distribution medium value VMED and the standard deviation value SGM before they are updated based on a comparison with the logarithmic transformation value LVPK of the peak hold value VKPEAK that was sampled this time.

(when LVPK>VMED)

VMED←VMED+ΔM (when LVPK≦VMED)

VMED←VMED−ΔM  [Expression 1]

(when VMED−SGM<LVPK<VMED)

SGM←SGM−2×ΔS (when LVPK≦VMED−SGM, or when LVPK≧VMED)

SGM←SGM+ΔS  [Expression 2]

Here, an update amount ΔM for the distribution medium value VMED is the quotient of the difference between the logarithmic transformation value LVPK that was sampled this time and the distribution medium value VMED prior to being updated divided by a predetermined value n1 (for example, "4"). Also, an update amount ΔS for the standard deviation value SGM is the quotient of the update amount ΔM for the distribution medium value VMED divided by a predetermined value n2 (for example, "8").

The knock determination level is obtained from the distribution parameters that have been updated in this way. Here, the following two knock determination levels, i.e., a no-knock determination value P1 and a large-knock determination value P2, are set.

The no-knock determination value P1 is a knock determination level for determining the presence or absence of knock and is obtained by Expression 3 below. In the expression, the term "u" is a coefficient referred to as a u value and is calculated based on the engine speed NE.

$P1 < VMED + u \times SGM$  [Expression 3]

The large-knock determination value P2 is a knock determination level for determining the presence or absence of knock on a large scale and is obtained by Expression 4 below.

$P2 < P1 + 2 \times SGM$  [Expression 4]

The knock determination is performed based on a comparison between the knock determination level obtained in this way and the logarithmic transformation value LVPK that was sampled this time (step S260). That is, if the logarithmic transformation value LVPK that was sampled this time is equal to, or less than, the no-knock determination value P1, then it is determined that knock will not occur during the combustion this time in the subject cylinder. If the logarithmic transformation value LVPK that was sampled this time is greater than the no-knock determination value P1 but less than the large-knock determination value P2, then it is determined that knock will occur on a fairly small scale during the combustion this time in the subject cylinder. Further, if the logarithmic transformation value LVPK that was sampled this time is equal to, or larger than, the large-knock determination value P2, then it is determined that knock will occur on a large scale during the combustion this time in the subject cylinder. After the determination is made, the process returns to step S210.

The routine described above is repeatedly executed by the ECU 20 after the engine is started. As a result, knock determination is performed each time combustion takes place in each of the cylinders.

The knock control of the exemplary embodiment will now be described. The knock control is performed in order to optimize the ignition timing by changing the ignition timing based on the determination results of the knock determination. In general, the knock control is performed by retarding a target ignition timing AFIN, which is a control target value for the ignition timing, by a retard amount β when it has been determined in the knock determination that there is knock, and advancing the target ignition timing AFIN by an advance amount a when it has been determined that there is no knock.

Also, in the knock control, a KCS learning value AGKNK, which is a learning value for learn-correcting the knock limit ignition timing which is the ignition timing just before knock occurs, is also updated. This is done by adding a predetermined amount to the value of the KCS learning value AGKNK when it has been determined that there is knock and subtracting a predetermined amount from the value of the KCS learning value AGKNK when it has been determined that there is no knock. The amount added to and the amount subtracted from the KCS learning value AGKNK are set to values that are sufficiently small compared to the retard amount $\beta$ and the advance amount $\alpha$.

A target ignition timing AFIN indicates the timing at which to perform ignition in each cylinder with the crank angle (BTDC), with TDC on the compression stroke of each cylinder being the reference point. The ECU 20 outputs the ignition signal, which turns on at a timing indicated by the target ignition timing AFIN, to the igniter 13 of each cylinder, and performs ignition.

Figure 3:
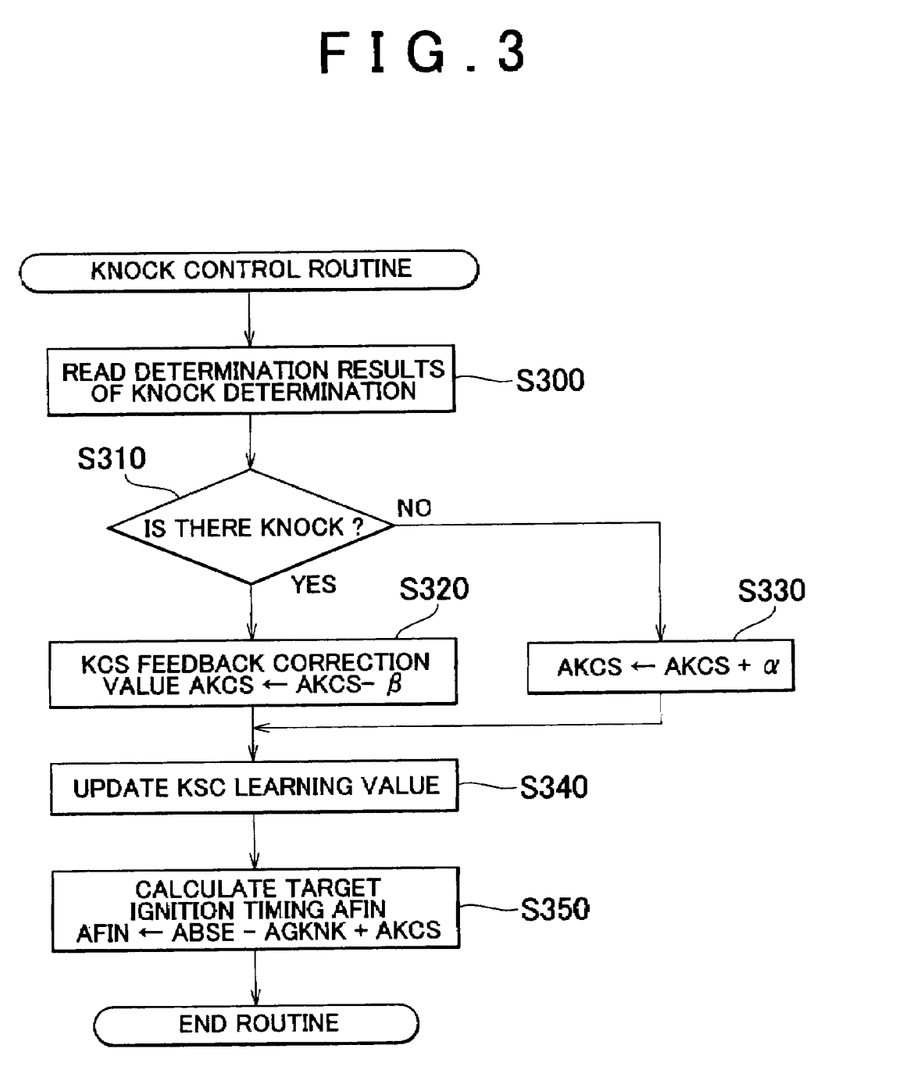
FIG. 3 is a flowchart illustrating a knock control routine according to the first exemplary embodiment of the invention.

FIG. 3 shows a flowchart of the knock control routine. When the routine starts, the determination results of the knock determination routine are first read in step S300. Then in step S310 it is determined whether those determination results indicate that there is a knock. If it is determined that there is knock (i.e., if the determination is "YES"), then the retard amount $\beta$ is subtracted from the value of a KCS feedback correction value AKCS in step S320. If the results of the knock determination indicate that there is no knock (i.e., if the determination is "NO"), the advance amount $\alpha$ is added to the value of the KCS feedback correction value AKCS in step S330. This advance amount $\alpha$ is set to a value that is sufficiently small compared to the retard amount $\beta$.

After the KCS feedback correction value AKCS has been increased or decreased according to the determination results of the knock determination, the KCS learning value AGKNK is then updated in step S340 based on the determination results of the knock determination.

Then in step S350, the target ignition timing AFIN is calculated. The calculation of the target ignition timing AFIN is performed based on Expression 5 below. In the expression, the term ABSE is a maximum advance ignition timing, which is the advance limit for the ignition timing. The ABSE is set based on the engine speed NE and the like.

$$AFIN \leftarrow ABSE - AGKNK + AKCS \quad \text{Expression 5}$$

Figure 4:
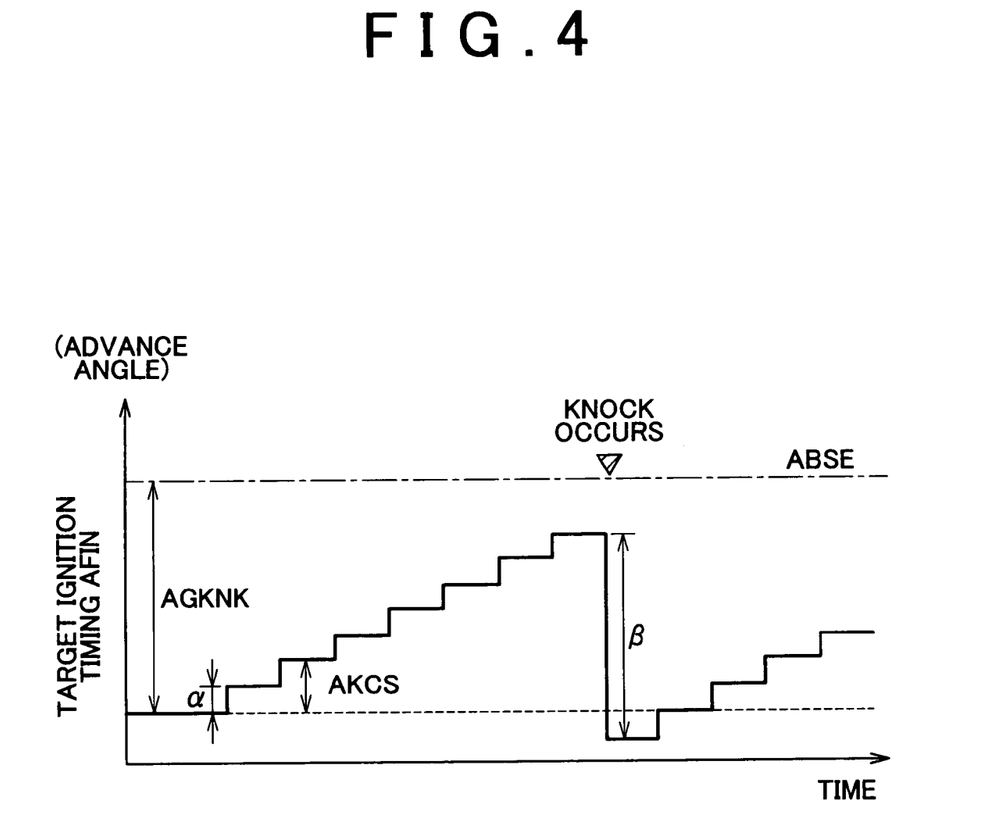
FIG. 4 is time chart illustrating one example of a knock control mode according to the first exemplary embodiment of the invention.

FIG. 4 shows an example of a control mode of the knock control described above. In the drawing, when the knock control starts, the target ignition timing AFIN advances gradually in increments of the advance amount a for the period during which it is determined in the knock determination that there is no knock. However, when there is knock and the determination is indicative of such, the target ignition timing AFIN is retarded by the retard amount $\beta$. Accordingly, the target ignition timing AFIN is shifted near the knock limit ignition timing.

In actuality, the value of the KCS learning value AGKNK is updated according to the determination results of the knock determination as described above, but that value is shown as being uniform in the drawing. Incidentally, the rate of change in that value related to the updating of the KCS learning value AGKNK is sufficiently small compared to the rate of change in the value of the KCS feedback correction value AKCS.

By updating the KCS learning value AGKNK in this way, the value of the KCS learning value AGKNK indicates the actual retard amount of the knock limit ignition timing with respect to the maximum advance ignition timing ABSE. Therefore, the actual knock limit ignition timing is expressed as ABSE−AGKNK.

In the exemplary embodiment as described above, a knock determination is made based on the output signal from the knock sensor 21 during the knock determination period, and the ignition timing is changed based on those determination results. On the other hand, in the exemplary embodiment, the fuel injection timing is changed according to the operating state of the engine, and the knock determination period overlaps or does not overlap with the fuel injection period depending on the operating state of the engine.

Figure 5:
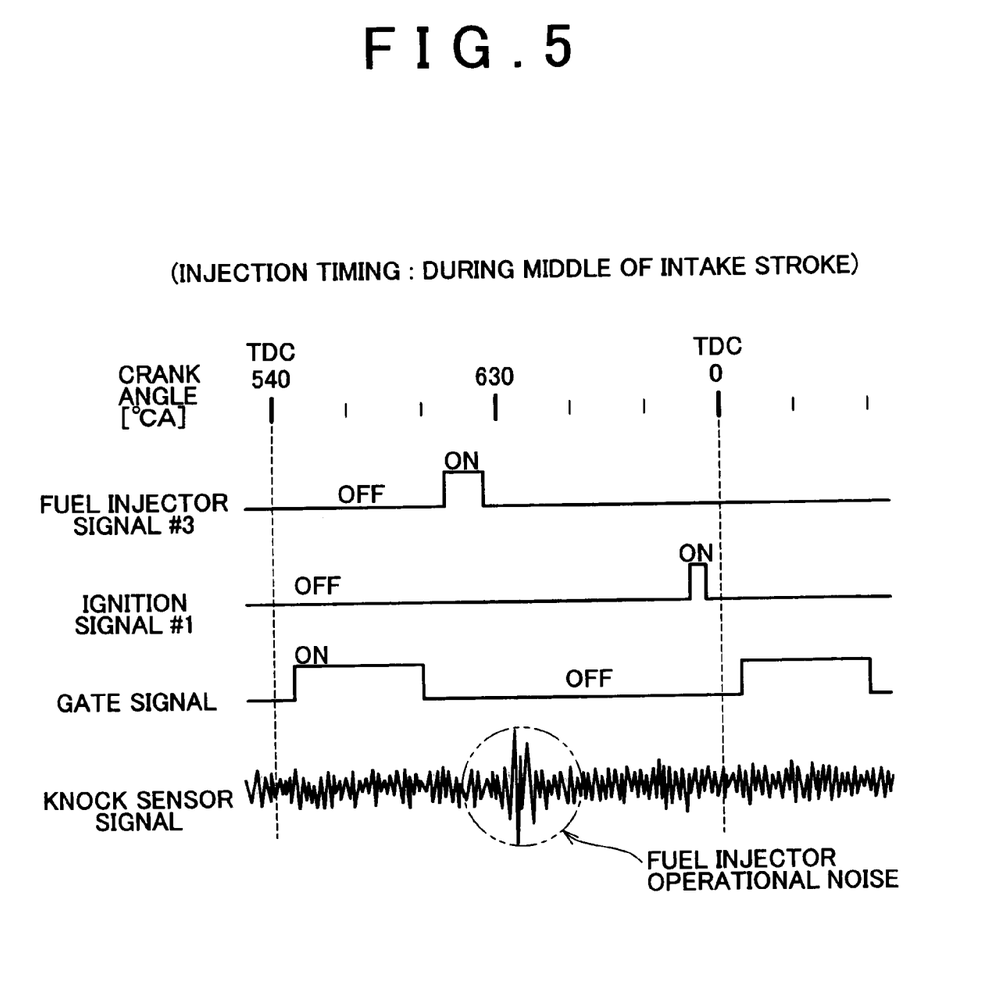
FIG. 5 is a time chart illustrating examples of waveforms of various signals when the fuel injection timing is set to be in the middle of the intake stroke.

FIG. 5 shows examples of waveforms of a fuel injection signal, an ignition signal, a gate signal, and an output signal from the knock sensor 21 (i.e., knock sensor signal) when the fuel injection timing is set to be in the middle of the intake stroke. As shown in the drawing, the fuel injection period (the period during which the fuel injection signal is on) at this time does not overlap with the knock determination period (the period during which the gate signal is on). Accordingly, operational noise from the fuel injector 12 does not ride on the knock sensor signal during the knock determination period so the background noise level is low.

Figure 6:
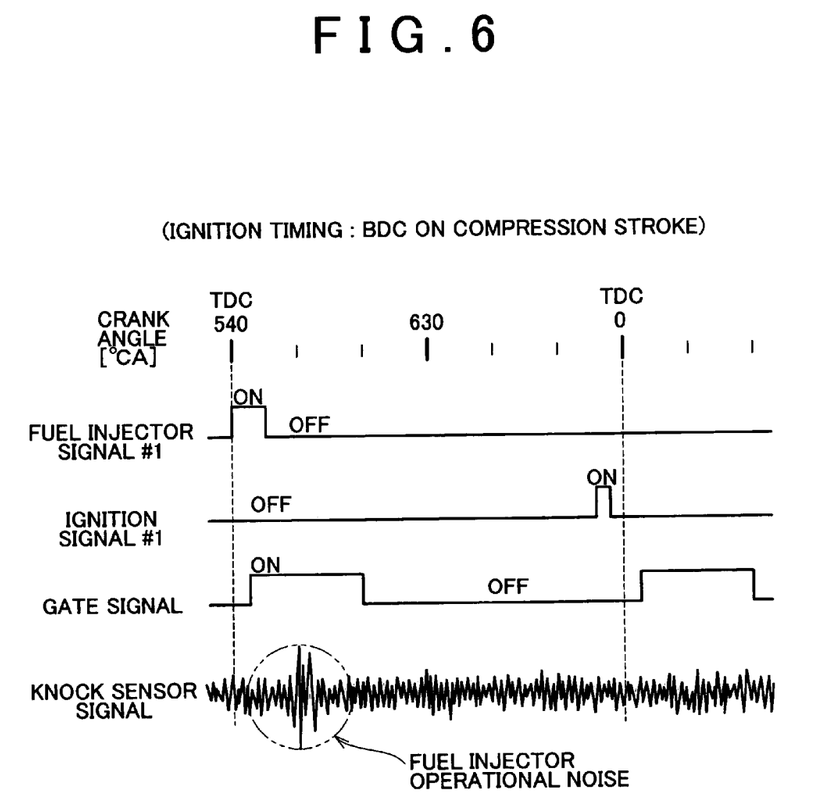
FIG. 6 is a time chart illustrating examples of waveforms of various signals when the fuel injection timing is set to be at BDC of the compression stroke.

Meanwhile, FIG. 6 shows examples of waveforms of the various signals when the fuel injection timing is set to be at BDC on the compression stroke. As shown in the drawing, the fuel injection period at this time overlaps with the knock determination period. Therefore, at this time operational noise from the fuel injector 12 rides on the knock sensor signal during the knock determination period.

Here, when the knock determination period and the fuel injection period are switched from a state in which they are not overlapping, as shown in FIG. 5, to a state in which they are overlapping, as shown in FIG. 6, by changing the fuel injection timing according to the operating state of the engine, there is a possibility that immediately after the switch an erroneous determination that knock is occurring will be made even though it is not.

That is, before the switch, the two knock determination values (i.e., the no-knock determination value P1 and the large-knock determination value P2) related to the knock determination are set based on the relatively small background noise level, in which there is no effect from the operational noise of the fuel injector 12 on the output signal from the knock sensor 21. On the other hand, if after the switch operational noise from the fuel injector 12 continues to ride for a while on the output signal from the knock sensor 21 during the knock determination period, the resultant effect will be reflected in the knock determination value. Immediately after the switch, however, the knock determination value is still a value that presumes the relatively low background noise level until that point. Therefore, until the effect from the operational noise from the fuel injector 12 is reflected in the knock determination value, the operational noise from the fuel injector 12 that appears on the detection signal from the knock sensor 21 may be erroneously determined to be from knock. Then based on that erroneous determination, the target ignition timing AFIN, may end up being changed inappropriately.

Accordingly, in this exemplary embodiment, when the fuel injection period and the knock determination period switch from a state in which they do not overlap to a state in which they do overlap, a change in the ignition timing based on the determination results of the knock determination, i.e., execution of the knock control routine, is prohibited after that switch until a predetermined period of time has passed. During the period for which execution of the knock control routine is prohibited, the target ignition timing AFIN is set based on Expression 6 below.

$$AFIN \leftarrow ABSE-AGKNK-A \qquad \text{Expression 6}$$

That is, at this time, the target ignition timing AFIN is set to a value retarded from the knock limit ignition timing by a value A (for example, 3 degrees CA) based on the knock limit ignition timing learned by the KCS learning value AGKNK. As a result, even while knock control is prohibited, the ignition timing is reliably set to the retard side of the knock limit ignition timing so that knock is preferably inhibited.

Figure 7:
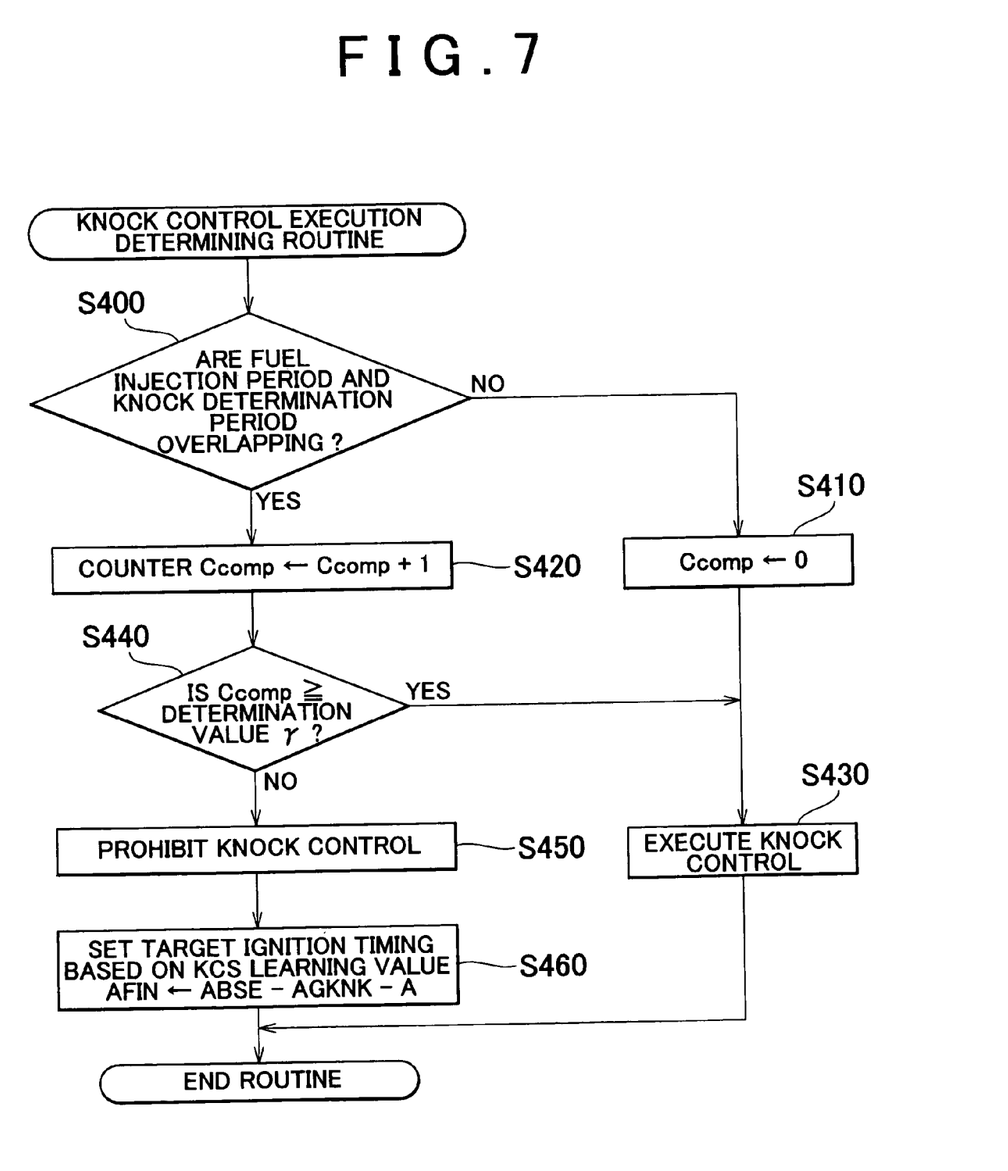
FIG. 7 is a flowchart illustrating a routine for determining whether to execute the knock control according to the first exemplary embodiment of the invention.

FIG. 7 is a flowchart illustrating a knock control execution determining routine, in which a determination relating to whether to prohibit or allow the kind of knock control described above is made and the target ignition timing AFIN while knock control is prohibited is set. This routine is executed by the ECU 20 at a timing, which is set in advance, at which the target ignition timing AFIN is calculated while the engine is running.

When the routine starts, it is first determined in step S400 whether the fuel injection period and the knock determination period overlap. This determination is made based on the fuel injection timing at that time and a setting value for the fuel injection time.

If it is determined that the two do not overlap (i.e., NO in step S400), a value of a counter Ccomp is set to "0" in step S410. The knock control routine is then executed in step S430 and this cycle of this routine ends. At this time, the target ignition timing AFIN is set according to the determination results of the knock determination through the knock control.

If it is determined that the two do overlap (i.e., YES in step S400), the value of the counter Ccomp is increased by "1" in step S420. Then in step S440, it is determined whether the value of the counter Ccomp is equal to, or greater than, a predetermined determination value γ.

If the value of the counter Ccomp is less than the determination value γ (i.e., NO in step S440), execution of the knock control is prohibited in step S450, the target ignition timing AFIN is set in step S460 based on Expression 6 above, and this cycle of the routine ends. If, on the other hand, the value of the counter Ccomp is equal to, or greater than, the determination value γ (i.e., YES in step S440), the knock control routine is executed in step S430 and this cycle of the routine ends. As a result, after the fuel injection period and the knock determination period switch from a state in which they do not overlap to a state in which they do overlap, execution of the knock control routine is prohibited for a period until the value of the counter Ccomp becomes equal to, or greater than, the determination value γ. This determination value γ is set so that execution of the knock control routine is prohibited for a period of time sufficient for the knock determination value to be updated to a proper value that reflects the effect of operational noise from the fuel injector 12.

In this exemplary embodiment, the ignition timing corresponds to the engine control amount that is changed based on the determination results of the knock determination, and the knock limit ignition timing (ABSE−AGKNK) learned based on the KCS learning value AGKNK corresponds to the knock limit value for that knock limit ignition timing. Also, step S340 in FIG. 3 for updating the KCS learning value AGKNK corresponds to the process performed by the learning means (the learning device). Further, step S450 in FIG. 7 for prohibiting execution of the knock control routine corresponds to the process performed by the prohibiting means (the prohibiting device), and step S460 in FIG. 7 for setting the target ignition timing AFIN based on the knock limit ignition timing while the knock control is prohibited corresponds to the process performed by the setting means (the setting device).

The following effects are able to be achieved with the exemplary embodiment described above.

(1) In the exemplary embodiment, when the knock determination period and the fuel injection period have switched from a state in which they do not overlap to a state in which they do overlap, execution of the knock control, i.e., changing the ignition timing based on the determination results of the knock determination, is prohibited after the switch until a predetermined period of time has passed. As a result, the ignition timing is prohibited from being changed based on the determination results until a proper determination value that reflects the effect from the operational noise from the fuel injector 12 is set and a proper knock determination can be made. Therefore, a case in which the ignition timing is changed improperly based on erroneous results of a knock determination can be preferably avoided.

(2) In the exemplary embodiment, when the knock control is prohibited, the target ignition timing AFIN is set based on the actual knock limit ignition timing (i.e., ABSE−AGKNK) learned by the KCS learning value AGKNK, so as to be on the retard side of the knock limit ignition timing. Therefore, even when the knock control is prohibited, it is still possible to preferably inhibit knock while setting the ignition timing near the knock limit ignition timing.

This exemplary embodiment may also be modified as follows.

In the foregoing exemplary embodiment, the target ignition timing AFIN is set to the retarded side of the knock limit ignition timing based on the learned knock limit ignition timing for the period during which a change in the ignition timing based on the determination results of the knock determination is prohibited. Alternatively, however, the manner in which the target ignition timing AFIN during the period for which that change is prohibited is set may also be changed appropriately. For example, even if the target ignition timing AFIN during the period for which knock control is prohibited is a fixed value that is set in advance, if it is set to a value that enables knock to be reliably inhibited, it is thus possible to inhibit knock while avoiding improper control from being performed due to the effect from operational noise from the fuel injector 12.

In the knock control execution determining routine in FIG. 7, execution of knock control in which the ignition timing is changed based on the determination results of the knock determination is prohibited from after the fuel injection period and the knock determination period have switched from a state in which they do not overlap to a state in which they do overlap until a predetermined period of time has passed. However, even if execution of the knock control is prohibited throughout the entire period during which the fuel injection period and the knock determination period overlap, it is still possible to inhibit improper control due to the effect of operational noise from the fuel injector 12 from being performed.

Further, execution of the knock control as well as execution of the knock determination may also be prohibited during that period. In this case as well, it is of course possible to inhibit improper control due to the effect of operational noise from the fuel injector 12 from being performed.

The manner in which the KCS feedback correction value AKCS and the KCS learning value AGKNK are updated in the knock control routine in FIG. 3 may also be changed appropriately. Also, the manner in which the target ignition timing AFIN is calculated in the knock control routine may also be changed appropriately. In this case as well, if the target ignition timing AFIN is changed based on the determination results of the knock determination, applying the knock control execution determining routine according to the exemplary embodiment makes it possible to preferably inhibit an improper change in the target ignition timing AFIN due to the effect from operational noise from the fuel injector 12, and thereby avoid a case in which improper control is performed.

The specific details of the knock determination shown in FIG. 2 may also be changed arbitrarily as long as the knock determination is made based on the output signal from the knock sensor 21 during the set knock determination period.

In the foregoing exemplary embodiment, a case was described in which the knock control targeting the ignition timing is performed. However, aside from the ignition timing, with an engine control amount that can be changed based on the determination results of the knock determination, there is a possibility that an improper change may be made due to the effect of operational noise from the fuel injector 12. Accordingly, if a routine is employed that is the same or similar to the knock control execution determining routine in the exemplary embodiment, which targets that engine control amount, it is possible to preferably avoid a case in which improper control is performed as a result of an improper change in that engine control amount due to the effect of operational noise from the fuel injector 12.

Incidentally, with that kind of engine control amount as well, if the knock limit value is learned based on the determination results of the knock determination, it is possible to preferably avoid knock by setting the engine control amount for the period during which the engine control amount is prohibited from being changed based on the determination results of the knock determination to the side of the knock limit value where knock is less apt to occur, based on the knock limit value.

The structure of the internal combustion engine to which the invention is applied is not limited to that described above, but may be changed arbitrarily. For example, even in a port injection type internal combustion engine, the invention may be useful if operational noise from a fuel injector ever rides on the output signal from the knock sensor.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A knock control apparatus for a multi-cylinder internal combustion engine, comprising:
    a fuel injection timing changing device that changes a fuel injection timing in each cylinder based on an operating state of the engine;
    a knock determining device that makes a knock determination for each cylinder based on an output signal from a knock sensor during a knock determination period corresponding to each cylinder;
    an engine control amount changing device that changes an engine control amount based on determination results of the knock determination; and
    a prohibiting device that prohibits execution of the knock determination when a fuel injection period in a first cylinder overlaps with the knock determination period corresponding to a second cylinder.

2. The knock control apparatus according to claim 1, wherein the engine control amount is an ignition timing.

3. The knock control apparatus according to claim 1, wherein the knock determination is made based on a comparison between i) a background level obtained based on the output signal from the knock sensor during the knock determination period in the knock determinations up until a previous knock determination, and ii) the output signal from the knock sensor during the knock determination period for a current knock determination.

4. The knock control apparatus according to claim 1, wherein the internal combustion engine is an in-cylinder injection internal combustion engine.

5. A knock control apparatus for a multi-cylinder internal combustion engine, comprising:
    a fuel injection timing changing device that changes a fuel injection timing in each cylinder based on an operating state of the engine;
    a knock determining device that makes a knock determination for each cylinder based on an output signal from a knock sensor during a knock determination period corresponding to each cylinder;
    an engine control amount changing device that changes an engine control amount based on determination results of the knock determination; and
    a prohibiting device that prohibits a change in the engine control amount based on the determination results when a fuel injection period in a first cylinder and the knock determination period corresponding to a second cylinder overlap.

6. The knock control apparatus according to claim 5, wherein, when the fuel injection period in the first cylinder and the knock determination period corresponding to the second cylinder have switched from a state in which they do not overlap to a state in which they do overlap, the prohibiting device prohibits a change in the engine control amount based on the determination results from after the switch until a predetermined period of time has passed.

7. The knock control apparatus according to claim 5, further comprising:
    a learning device that learns a knock limit value for the engine control amount based on the determination results; and
    a setting device that sets the engine control amount to a side of the knock limit value where knock is less apt to occur based on the knock limit value learned by the learning device, when a change in the engine control amount based on the determination results is prohibited by the prohibiting device.

8. The knock control apparatus according to claim 7, wherein the learning device learns the knock limit value for the engine control amount by obtaining, based on the determination results, a learning value for learn-correcting the knock limit value of the engine control amount.

9. The knock control apparatus according to claim 7, wherein the engine control amount is an ignition timing, the knock limit value is a knock limit ignition timing, and the setting device sets the engine control amount to a retard side of the knock limit ignition timing based on the knock limit ignition timing learned by the learning device, when a change in the engine control amount is prohibited by the prohibiting device based on the determination results.

10. The knock control apparatus according to claim 5, wherein the engine control amount is an ignition timing.

11. The knock control apparatus according to claim 5, wherein the knock determination is made based on a comparison between i) a background level obtained based on the output signal from the knock sensor during the knock determination period in the knock determinations up until a previous knock determination, and ii) the output signal from the knock sensor during the knock determination period for a current knock determination.

12. The knock control apparatus according to claim 5, wherein the internal combustion engine is an in-cylinder injection internal combustion engine.

13. A knock control method for a multi-cylinder internal combustion engine, comprising the steps of:
   changing a fuel injection timing in each cylinder based on an operating state of the engine;
   making a knock determination for each cylinder based on an output signal from a knock sensor during a knock determination period corresponding to each cylinder;
   changing an engine control amount based on determination results of the knock determination; and
   prohibiting execution of the knock determination when a fuel injection period in a first cylinder overlaps with the knock determination period corresponding to a second cylinder.

14. The knock control method according to claim 13, wherein the engine control amount is an ignition timing.

15. The knock control method according to claim 13, wherein the knock determination is made based on a comparison between i) a background level obtained based on the output signal from the knock sensor during the knock determination period in the knock determinations up until a previous knock determination, and ii) the output signal from the knock sensor during the knock determination period for a current knock determination this time.

16. A knock control method for a multi-cylinder internal combustion engine, comprising the steps of:
   changing a fuel injection timing in each cylinder based on an operating state of the engine;
   making a knock determination for each cylinder based on an output signal from a knock sensor during a knock determination period corresponding to each cylinder;
   changing an engine control amount based on determination results of the knock determination; and
   prohibiting a change in the engine control amount based on the determination results when a fuel injection period in a first cylinder and the knock determination period corresponding to a second cylinder overlap.

17. The knock control method according to claim 16, wherein, when the fuel injection period in the first cylinder and the knock determination period corresponding to the second cylinder have switched from a state in which they do not overlap to a state in which they do overlap, the prohibiting device prohibits a change in the engine control amount based on the determination results from after the switch until a predetermined period of time has passed.

18. The knock control method according to claim 17, further comprising the steps of:
   learning a knock limit value for the engine control amount based on the determination results; and
   setting the engine control amount to a side of the knock limit value where knock is less apt to occur based on the learned knock limit value, when a change in the engine control amount is prohibited based on the determination results.

19. The knock control method according to claim 18, wherein a learning value for learn-correcting the knock limit value for the engine control amount is obtained based on the determination results.

20. The knock control method according to claim 18, wherein the engine control amount is an ignition timing, the knock limit value is a knock limit ignition timing, and the engine control amount is set to a retard side of the knock limit ignition timing based on the learned knock limit ignition timing when a change in the engine control amount based on the determination results is prohibited.

21. The knock control method according to claim 16, wherein the engine control amount is an ignition timing.

22. The knock control method according to claim 16, wherein the knock determination is made based on a comparison between i) a background level obtained based on the output signal from the knock sensor during the knock determination period in the knock determinations up until a previous knock determination, and ii) the output signal from the knock sensor during the knock determination period for a current knock determination this time.

* * * * *

UNITED STATES PATENT AND TRADEMARK OFFICE
CERTIFICATE OF CORRECTION

PATENT NO. : 7,007,663 B2  Page 1 of 1
APPLICATION NO. : 10/792211
DATED : March 7, 2006
INVENTOR(S) : Mashiki It is certified that error appears in the above-identified patent and that said Letters Patent is hereby corrected as shown below:

| Column | Line | |
|---|---|---|
| 8 | 26 | Change "P1<VMED + u x SGM" to --P1← VMED + u x SGM--. |
| 8 | 33 | Change "P2<P1 + 2 x SMG" to --P2← P1 + 2 x SGM--. |

Signed and Sealed this

Twenty-second Day of August, 2006

JON W. DUDAS
*Director of the United States Patent and Trademark Office*